United States Patent [19]

Boden et al.

[11] 4,314,955
[45] Feb. 9, 1982

[54] METHOD OF FILLING CAVITIES, IN PARTICULAR, MOLD CAVITIES, WITH A REACTIVE FLOWABLE MIXTURE

[75] Inventors: Heinrich Boden, Leverkusen; Walter Schneider, Overath, both of Fed. Rep. of Germany

[73] Assignee: Bayer Aktiengesellschaft, Bayerwerk, Fed. Rep. of Germany

[21] Appl. No.: 180,183

[22] Filed: Aug. 21, 1980

[30] Foreign Application Priority Data

Aug. 24, 1979 [DE] Fed. Rep. of Germany ....... 2934354

[51] Int. Cl.³ .......................... B29D 27/00; B29F 1/04
[52] U.S. Cl. .................................. 264/51; 264/328.6; 264/DIG. 83; 422/133; 422/134; 425/543; 425/562; 425/817 R
[58] Field of Search .................. 264/DIG. 83, 54, 51, 264/328.6, ; 422/133, 134, 135; 425/562, 543, 817 R

[56] References Cited

U.S. PATENT DOCUMENTS

| | | | |
|---|---|---|---|
| 3,617,029 | 11/1971 | Breer et al. | 422/133 |
| 3,690,800 | 9/1972 | Schwab et al. | 425/562 X |
| 3,982,870 | 9/1976 | Boden et al. | 264/DIG. 83 |
| 4,129,636 | 12/1978 | Boden et al. | 264/DIG. 83 |

*Primary Examiner*—Philip Anderson
*Attorney, Agent, or Firm*—Gene Harsh; Joseph C. Gil

[57] ABSTRACT

The invention relates to a method of filling cavities and, in particular, mold cavities, with a reactive solid-forming or foam-forming mixture, wherein at least two reactants are introduced into a spatially limited mixing zone, mixed therein as they pass through, and the mixture produced is introduced into a mold cavity where it reacts and wherein the mold cavity is initially enlarged in-part for storing a portion of the mixture, which portion is subsequently transferred to the final mold cavity volume. The object of the invention is to produce plastic articles which are shaped in molds, but also to fill out other cavities, for example, for the purposes of reinforcement.

4 Claims, 7 Drawing Figures

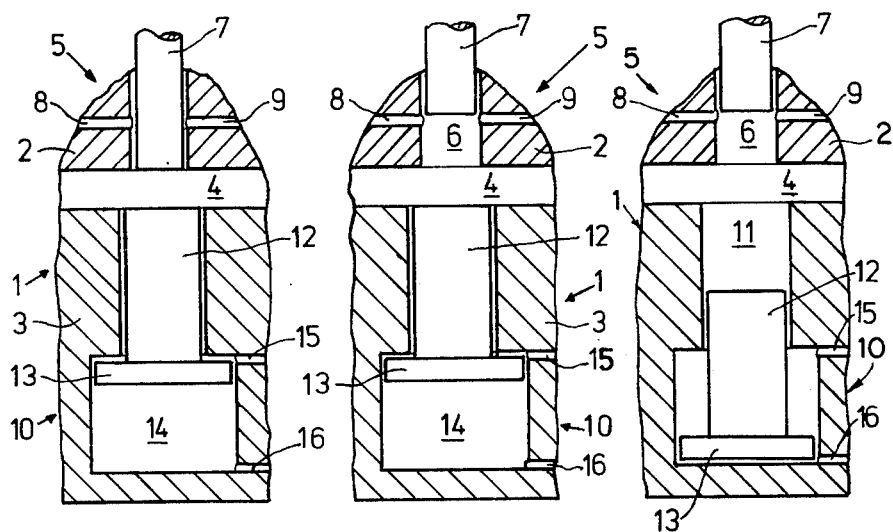
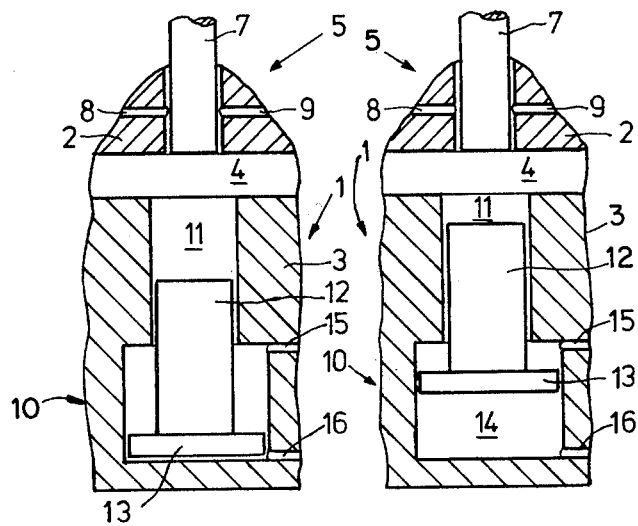

METHOD OF FILLING CAVITIES, IN PARTICULAR, MOLD CAVITIES, WITH A REACTIVE FLOWABLE MIXTURE

BACKGROUND OF THE INVENTION

Solid, absolutely bubble-free shaped articles, for example, (those made of reaction-cast polyurethane elastomers) are produced extensively in open molds, for example, by so-called open manual casting. In this process, the flowable, slightly activated multi-component reaction mixture is poured slowly into the mold without whirl or turbulence so as to avoid the trapping of bubbles. Any air bubbles possibly occurring on the free surface are destroyed by burning them off with a burner flame.

Attempts have been made to produce solid shaped articles which are free from bubbles and blow holes in closed molds, in particular, from highly reactive multi-component reaction mixtures to allow short cycle times for the economic mass production of such shaped articles which are usually of large volume. The use of self-cleaning, forced control fitted injection mix heads and the knowledge about the laminar filling operation avoiding the trapping of air by building up a closed flow front through the reaction mixture entering the mold cavity at high speed, also allow for the production of shaped articles which are usually thin-walled from highly reactive multi-component reaction mixtures of this type (for example, based on polyurethane).

However, the metering instruments with injection mixers used in the past allowed only a predetermined total quantity of mixture to be metered. It is known that molds for the production of identically shaped articles of the type used regularly for mass production in, for example, the automotive industry, have tolerances in their mold cavities due to production. This means that the volumes of the cavities of identical molds may differ slightly from each other. In order to eliminate any differences in volume during the successive filling of these molds using the same metering unit, the molds are charged with too much reaction mixture and the excess quantity is carried off or collected by means of a separating plane, ventilation ducts or in lost riser gates. This process has the disadvantage of material waste and of the subsequent work needed to remove the expelled material. The problem arises, in particular, during the production of relatively large shaped articles for which purpose a large quantity of reaction mixture must be introduced into the mold within a few seconds due to the short setting times. Although the air contained in the mold cavity can escape freely at the beginning, the area available for ventilation generally decreases to an even greater extent as the degree of filling increases. In this process, the ventilation problem is aggravated, particularly if the mold cavity is designed in such a way that the cross-section of the portion to be filled last contracts and the flow front thus progresses more quickly. The danger of trapping air then arises.

Finally, the inaccuracy in switching by means of the time clocks used for controlling the metering process has an adverse effect due to the short metering times. The time clocks available at present have, for example, an error of a maximum of 0.5%, related to the final value set. If this final value is, for example, 3 seconds, an error of 1.5% is already produced after a metering time of 1 second. The total error is increased by additional timing errors which arise, for example, due to the conversion of the electrical control pulse by means of the reversal of a hydraulic valve and the mechanical reversal of the control members, such as slides or valves, thus triggered to actuate the mixer head. Variations in the temperature of the hydraulic fluid can also increase the error. A total error of 2% and above related to the mold filling time between reversal of the mixer from circulation into the mixing position and from the mixing position back into the circulation position after the filling operation can very easily occur in this way. During the production of shaped articles having a quite conventional volume of, for example 5 lit., an overall error in the filling volume of about 100 ml is produced over a mold filling time of 1 second.

The above-mentioned over-filling of a mold is also coupled with pressure rise in the mold cavity and thus also in the injection mixing chamber communicating with the mold cavity. This pressure rise inevitably influences the mixing conditions and can impair the mixed products.

The object of the invention is to ensure exact filling of cavities, in particular, of molds, without bubbles and blow holes, with simplified ventilation of the cavity toward the end of the mold filling operation, wherein a pressure which can optionally be preselected can preferably be monitored and controlled with relation to time in the entire system extending from the mixing chamber to the cavity.

DESCRIPTION OF THE INVENTION

The object is achieved in that:
(a) the volume of the cavity is initially increased beyond the final volume desired while pouring the reaction mixture into the cavity, whereby
(ba) the rate of flow of the mixture in the cavity is reduced and whereby
(bb) mixture is stored in the additional cavity volume,
(c) upon completion of introduction of the mixture, the volume of the cavity is reduced again at a predetermined moment in time whereby
(ca) the stored mixture is displaced at least partially into the cavity, and whereby
(cb) the rate of flow of the mixture is kept smaller than during the actual filling process.

In this process, the volume is preferably increased toward the end of the mixing and filling phase when the flow front would be expected to rise rapidly. It can however, also take place sooner. The storage of a proportion of the mixture by increasing the volume causes a reduction in the rate at which the full level rises. In other words, the rate of a flow front formed by the reaction mixture is reduced, ensuring that the mold cavity is ventilated carefully, and obstacles in the cavity are flowed around without trapping any air. If cavities of equal volume are to be filled (such as, for example, during the mass production of shaped articles with several similar molds), or for filling out cavities of equal volume, then the magnitude of the store volume is preferably selected equal to the volume tolerance difference of these cavities.

Since the actual mold filling operation which is finished upon completion of the mixing operation (or once the mixing chamber is emptied) is interrupted according to step (c) before the stored quantity of mixture is displaced and fills the last portion of the cavity, the flow front is completely calmed. A slight, but uncontrolled build up of pressure due to air which has not escaped can be reduced again in this time interval. The moment at which the stored mixture is displaced is selected as a function of the reaction rate of the mixture. It goes without saying that the displacement has to take place at the latest at the moment when the mixture is still sufficiently flowable to fill out the entire volume of the cavity without internal tensions arising due to the start of setting.

The method according to the invention can be applied not only to solid-forming reaction mixtures but also to those which form foam, and in particular, of high density.

The stored fraction of the mixture is preferably displaced at a defined pressure which can optionally be varied with time. This pressure is preferably maintained until the high viscosity curing phase is substantially completed so that the reaction shrinkage is eliminated at least in part by pushing the material out of the stored volume. In this process, the pressure can also be altered over this period if necessary. As the cavity is not overfilled during the actual mixing operation, the mixing cannot be adversely affected, for example, by a rise of pressure in the mixing chamber. The method according to the invention also allows the size of the ventilation slits to be reduced. The undesirable expulsion in the mold separating plane can also be substantially eliminated in this way. Subsequently, processing of shaped articles is thus reduced.

Various suitable expedients exist for storage. For example, a movable and controllable piston can be arranged opposite the mixing chamber outlet in a storage passage if a mold having a fitted mixer head, but no casting channel, is being used. If a casting channel is present, the store will preferably be arranged in the region thereof. A store having an elastic diaphragm whose rear rests against a fixed contour in the relaxed condition is also particularly suitable, in which case it is possible to charge the space between this contour and the diaphragm hydraulically or pneumatically. The storing operation can be carried out by filling or emptying this space.

Finally, it is also possible to equip the wall of the mold cavity, at least in part, with an elastic diaphragm of in a similar way or to design it as an elastic diaphragm. This is only desirable if the accuracy of the contours of the shaped article in the region of the elastic diaphragm is unimportant.

DESCRIPTION OF THE DRAWING

The new process is described in the following in more detail with the aid of various devices suitable for carrying out the process. The figures illustrate the following:

FIGS. 1 to 5—a device in which an ejector piston mixer head and a piston store are integrated in the molding halves of a molding device, shown at different positions of the ejector piston and of the piston store;

In FIGS. 1 to 5 the device consists of a mold 1 with two mold halves 2 and 3 which enclose a mold cavity 4. In the mold half 2 a mixer head 5 is arranged (not completely shown) which mainly comprises a mixing chamber 6 in which an ejector piston 7 is guided. This piston 7 serves both for opening and closing the component feed channels 8 and 9 and for ejecting remains of the mixture from the mixing chamber 6, for the purpose of cleaning. Facing the mixing chamber 6 a piston store 10 is arranged in the mold half 3. In the passage 11, the axis of which is in line with that of the mixing chamber 6, a piston 12 is guided, to which pressure can be applied from both sides and which is provided with a pressure medium space 14 which is divided off by the collar 13 of the piston 12. This space is provided with pressure medium supply means 15 and 16. The control means for the pressure medium and the mixer head are not shown in greater detail. For those skilled in the art the necessary process steps automatically determine the design of such control means, which process steps are described as follows:

FIG. 1 shows the device in its resting position, i.e. with an unfilled mold 1. In FIG. 2 the ejector piston 7 is in the retracted position, so that the mixing chamber 6 is formed, into which the components are then injected via the inlets 8 and 9 which are provided with jets which are not illustrated. At the same time, while the reaction mixture formed in the mixing chamber 6 flows into the mold cavity the piston 12 is drawn back (FIG. 3), so that the volume of the mold cavity 4 is increased by the volume in the passage 11 evacuated by the piston 12. Thus the rate of flow of the mixture in the cavity 4 is decreased and mixture is stored in the gained cavity volume. Then reaction mixture flows into the mold cavity 4 for as long as is preset. Then (FIG. 4) the ejector piston 7 makes an exhaust stroke whereby the inlets 8 and 9 are closed and the mixing chamber 6 is emptied and displaced. Then the piston 12 is advanced again (FIG. 5) in such a way that the rate of flow of the mixture is kept lower than during the actual filling procedure. At the same time the piston 12 gradually fills the volume of the passage 11.

In FIG. 6 the device consists of a mold 21 with two mold halves 22, 23 between which a mold cavity 24 is enclosed. In the upper mold half 22 a mixer head 25 is indicated which mainly comprises a mixing chamber 26 in which an ejector piston 27 is guided. This serves both to open and to close the component inlets 28 and 29 as well as to eject the remains of the mixture from the mixing chamber 26 for the purpose of cleaning the latter. In the lower half 23 of the mold 21 a membrane store 30 is arranged. It comprises a cavity 31 to which a pressure medium can be applied (hydraulically or pneumatically), which cavity 31 is divided off from the mold cavity 24 by an elastic membrane 32 made of rubber. This cavity 31 is connected via a supply means 33 to a pressure medium source, not illustrated, and corresponding control mechanisms.

Figure 6:
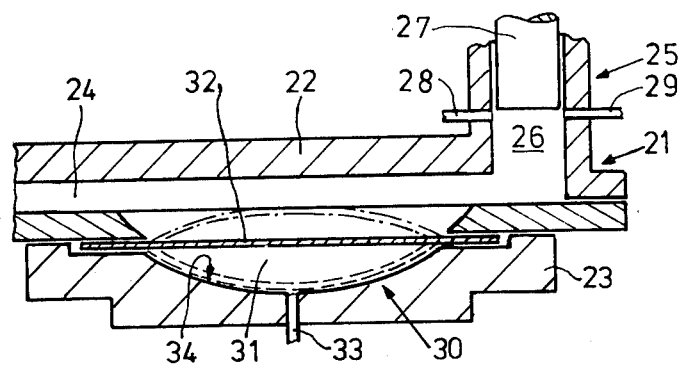
FIG. 6—a device in which an ejector piston mixer head and a diaphragm store are integrated in the mold halves of a mold, and FIG. 7—a device in which a mold having mold walls which are elastic in parts is provided with a mixer head.

When the device is in a resting position the membrane 32 is in the non-stretched position (unbroken lines). If the reaction mixture is introduced into the mold cavity 24, the membrane 32 is dilated and rests against the wall 34 of the bowl-shaped cavity 31 (broken line), the volume of the mold cavity 24 increasing correspondingly. In this released volume area storage of reaction mixture takes place. After termination of the mold-filling process the cavity 31 is filled with a pressure medium via the supply means 33, so that the membrane 32 again takes up its original position. At the same time the displaced reaction mixture is pressed into the actual mold cavity 24. The membrane 32 can however also be pushed even further into the mold cavity 24 (position indicated by dash-dot lines), in order to produce higher pressure in the mold cavity 24. In this case the molded article has to allow a corresponding surface forming.

The remaining process conditions with regard to rate of flow etc. correspond to those described in connection with FIGS. 1 to 5.

Figure 7:
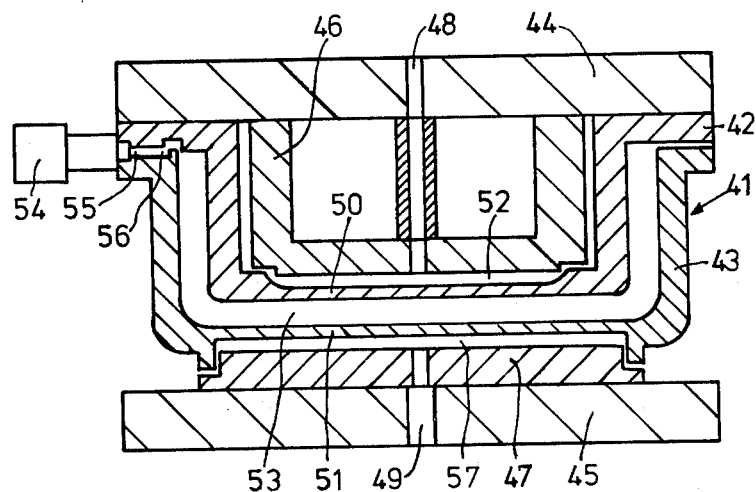

FIG. 7 shows a device designed in a similar manner to FIG. 6. The device consists of a mold 41 with the mold halves 42 and 43. These are clamped between two presser boards 44, 45 of a mold support not illustrated in more detail. Centring pieces 46 and 47 are arranged on the presser boards 44 and 45 through which the pressure medium supply means 48 and 49 pass. The mold halves 42 and 43 are arranged on the centring pieces 46 and 47. They consist of galvano-bowls with thin-walled bases 50, 51 so that cavities 52 and 53, serving as pressure chambers, are provided between those bases 50 and 51 and the centring pieces 46 and 47. The pressure medium supply means 48 and 49 open into these cavities. A mixer head 54 is attached to the mold separating plane 55 and is connected with the mold cavity 57 via a sprue channel 56. As the mold cavity 57 is filled, the thin-walled bases 50 and 51 arch by elastic deformation into the cavities 52 and 53 so that the mold cavity 54 is first of all enlarged. When the filling process has ended the cavities 52 and 53 are charged with a pressure medium via the supply means 48 and 49 so that the bases 50 and 51 are pressed back into their original position. The point of time at which the pressure medium is applied can be selected at any time up until the moment at which the mixture begins to solidify when reaction takes place. In this device the application of pressure to the reaction mixture is conducted advantageously over a large area. This is particularly suitable for compensating for reaction shrinkage and thus for reducing indentations in the region of material accumulation points in the molded article.

A similar effect can also be achieved by the use of molds with plunge edge sealing. In this the filling of the mold cavity after the necessary quantity of reaction mixture has been metered in is realized by plunging one mold half into the other and by the corresponding decrease of the volume.

In addition, in special cases, for example when filling small volume mold cavities using mixer heads with ejector pistons, the ejector piston can be used with at least one part of its stroke serving as a storage piston. Here, contrary to the devices used so far consisting of molds with attached ejector piston mixer heads, higher degrees of filling must be employed in order to achieve the desired effect.

What is claimed is:

1. In a method of filling cavities and, in particular, molds, with a reactive solid-forming or foam-forming mixture comprising introducing at least two reactants into a spatially limited mixing zone, mixing said reactants therein as they pass therethrough and conveying the mixture produced into a cavity where it reacts, the improvement wherein
    (a) the volume of the cavity is initially increased beyond the final volume to be obtained while introducing the reaction mixture into the cavity whereby
    (ba) the rate of flow of the mixture in the cavity is reduced and whereby
    (bb) mixture is stored in the additional cavity volume,
    (c) upon completion of introduction of the mixture, the volume of the cavity is reduced again whereby
    (ca) the stored mixture is displaced at least partially into the form-giving cavity and whereby
    (cb) the rate of flow of the mixture is kept smaller than during the actual filling process.

2. The method according to claim 1, characterized in that the stored fraction of the mixture is displaced below a defined pressure.

3. The method according to claim 1 or 2, characterized in that the mixture located in the form-giving cavity is kept under pressure at least some of the time.

4. A method according to claim 3, characterized in that the pressure applied can be altered.

* * * * *